United States Patent
Tanaka

(10) Patent No.: US 7,750,940 B2
(45) Date of Patent: Jul. 6, 2010

(54) CAMERA SYSTEM, CAMERA BODY, AND CAMERA HEAD

(75) Inventor: Hiroshi Tanaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1294 days.

(21) Appl. No.: 11/253,917

(22) Filed: Oct. 20, 2005

(65) Prior Publication Data
US 2006/0092312 A1 May 4, 2006

(30) Foreign Application Priority Data
Oct. 21, 2004 (JP) ............................. 2004-306948

(51) Int. Cl.
H04N 5/225 (2006.01)
G03B 17/00 (2006.01)
(52) U.S. Cl. .................. 348/207.99; 348/340; 396/529
(58) Field of Classification Search ................ 396/530, 396/298, 532
See application file for complete search history.

(56) References Cited

U.S. PATENT DOCUMENTS 4,851,897 A * 7/1989 Inuma et al. ............. 348/224.1
5,463,442 A * 10/1995 Harigaya et al. .............. 396/85
5,630,180 A * 5/1997 Kusaka ......................... 396/63
6,766,111 B2 * 7/2004 Uenaka et al. ................ 396/91
7,148,928 B2 * 12/2006 Minakuti et al. ............ 348/360

FOREIGN PATENT DOCUMENTS

| JP | 07-274060 A | | 10/1995 |
| JP | 08-172561 | * | 7/1996 |
| JP | 10-224685 A | | 8/1998 |
| JP | 2002-252800 A | | 9/2002 |
| JP | 2003-107315 A | | 4/2003 |

* cited by examiner

Primary Examiner—Luong T Nguyen
(74) Attorney, Agent, or Firm—Birch, Stewart, Kolasch & Birch, LLP

(57) ABSTRACT

An update file for updating a program in a camera head is read out of a memory card by using a body central processing unit, and names of a manufacturer, a product type, and a version are extracted. The names acquired from the memory card are compared with names of the manufacturer, the product type, and the version acquired from the camera head. Update data included in the update file are transmitted to a non-volatile memory in the camera head to update the program in the camera head only when the names of the manufacturer and the product type coincide with one another and when the version of the update file is newer than the version of the program in the camera head.

8 Claims, 14 Drawing Sheets

SETUP        SYSTEM UPDATE

UPDATE CONTENT : HEAD

MANUFACTURER : ABC

NAME OF PRODUCT TYPE : EFG

CURRENT VERSION : 01. 50

UPDATE VERSION : 02. 00

UPDATE 「EXECUTE」 「CANCEL」

Fig. 10

CAMERA SYSTEM, CAMERA BODY, AND CAMERA HEAD

BACKGROUND OF THE INVENTION

1. Field of the Invention

The present invention relates to a camera system including: a camera head which is provided with a photographic optical system and an image pickup device and is configured to generate image signals in accordance with given camera head data; and a camera body which is configured to fit the camera head interchangeably, to receive the image signals from the camera head, and to perform signal processing in accordance with given camera body data. The present invention also relates to the camera body constituting the camera system and to the camera head which is interchangeably fitted to the camera body.

2. Description of the Related Art

A camera system including: a camera head which is provided with a photographic optical system and an image pickup device and is configured to generate image signals in accordance with given camera head data; and a camera body which is configured to fit the camera head interchangeably, to receive the image signals from the camera head, and to perform signal processing in accordance with given camera body data, has been conceived in recent years. In this camera system, various grades of products ranging from a high grade to a low grade are assorted both in light of the camera head and in light of the camera body as appropriate, so that it is possible to combine any camera head selected easily with any camera body selected therefrom. By applying this configuration, it is possible to realize a camera system which meets any user's needs. Generally, in this camera system, the camera head includes a discrete central processing unit (CPU) and a storing section which stores a program containing given camera head data, and the camera body includes a discrete CPU and a storing section which stores a program containing given camera body data.

Here, some techniques for updating a camera program have been disclosed. For example, there is disclosed a technique configured to update a camera program by storing an extension file that affects an operation of a camera into a memory card which is detachably fitted to the camera in advance, and loading the file out of the memory card (see patent document 1: Japanese Patent Application Laid-open No. Hei 7(1995)-274060).

Meanwhile, there is disclosed a technique for updating a camera program by storing a program for realizing a camera function into an external storage medium in advance, then judging whether or not the program is compatible with a camera at the time of fitting the external storage medium to the camera, and transferring the program to the camera when the program is judged to be compatible with the camera (see patent document 2: Japanese Patent Application Laid-open No. Hei 10(1998)-224685).

Moreover, there is disclosed a technique configured to connect a camera to communication equipment such as a cellular telephone, to acquire information on a program for updating the camera from an external server through this communication equipment, and to update the camera based on the information (see patent document 3: Japanese Patent Application Laid-open No. 2002-252800).

Further, in a camera system designed for a camera body and a detachable lens barrel, there is disclosed a technique for updating a program for allowing the camera body to effectuate a function unique to the lens barrel by storing such a program into a storing section included in the lens barrel in advance, and transferring this program to the camera body (see patent document 4: Japanese Patent Application Laid-open No. 2003-107315).

Here, in terms of the camera system including the camera head and the camera body configured to fit the camera head interchangeably, there are the following problems when applying the techniques disclosed in the patent documents 1 and 2 for updating the program stored in the storing section of the camera head.

The technique disclosed in the patent document 1 is configured to update the camera program by fitting the memory card to the camera and then loading extension file that affects the operation of the camera. Meanwhile, the technique disclosed in the patent document 2 is configured to update the camera program when the program is judged to be compatible with the camera at the time of fitting the external storage medium to the camera. Accordingly, when the techniques disclosed in the patent document 1 or 2 is applied to the camera system, the program in the camera body may be updated but the program in the camera head cannot be updated. Here, it is also conceivable to provide the camera head with a slot for fitting the memory card or the external storage medium and to update the program in the camera head through this slot. However, it is unrealistic to provide the camera head with such a slot.

Meanwhile, in order to apply the technique disclosed in the patent document 3 to the camera system, it is necessary to provide digital interfaces for performing data transfer to and from the communication equipment such as a cellular telephone to both of the camera body and the camera head. Such a configuration brings redundancy to the camera system.

In addition, the technique disclosed in the patent document 4 is configured to update the program in the camera body for controlling the lens barrel by transferring the program for realizing the function unique to the lens barrel to the camera body. Accordingly, when this technique is applied to the camera system, the program in the camera body may be updated but the program in the camera head cannot be updated.

SUMMARY OF THE INVENTION

The present invention has been made in view of the above circumstances and provides a camera system which can update a program on a camera head's side without adding a special device on the camera head's side when any camera head is fitted to a camera body, the camera body constituting the camera system, and the camera head to be interchangeably fitted to the camera body.

A camera system of the present invention is a camera system which includes a camera head provided with a photographic optical system and an image pickup device and configured to generate image signals in accordance with given camera head data, and a camera body which fits the camera head interchangeably, receives the image signals from the camera head, and performs signal processing in accordance with given camera body data. Here, the camera body includes an acquiring section which acquires update data for updating the camera head data, and a transmitting section which transmits the update data acquired by the acquiring section to the camera head. Meanwhile, the camera head includes a receiving section which receives the update data transmitted from the transmitting section, and an updating section which updates the camera head data heretofore in operation with the update data received by the receiving section.

The camera system of the present invention is configured to receive the update data for updating the camera head data acquired by the camera body with the camera head, and to update the camera head data heretofore in operation with the update data thus received. Accordingly, when any camera head is fitted to the camera body, it is possible to update the program on the camera head's side without adding a special device to the camera head's side.

Here, the camera body preferably includes a type identifying section which identifies a type of the camera head fitted to the camera body, and the transmitting section preferably transmits the update data to the camera head only when the update data are compatible with the type of the camera head identified by the type identifying section.

In this configuration, even when any type of the camera head is fitted to the camera body, it is possible to ensure transmission of the update data compatible with the camera head to the camera head.

Meanwhile, in a preferable aspect, the camera body includes a version identifying sections which identifies a version of the camera head data written in the camera head fitted to the camera body, and the transmitting sections transmits the update data to the camera head only when the update data acquired by the acquiring section are of a newer version than the version identified by the version identifying section.

In this configuration, it is possible to ensure transmission of the update data of the newer version than the update data written in the camera head.

In addition, in a preferable aspect, the acquiring section acquires update data irrespective of whether the update data represent the update data for updating the camera head data or the update data represent update data for updating the camera body data. Moreover, the camera body preferably includes a judging section which judges whether the update data acquired by the acquiring section represent the update data for updating the camera head data or the update data for updating the camera body data, and the transmitting section transmits the update data to the camera head upon a judgment by the judging section that the update data acquired by the acquiring section represent the update data for updating the camera head data.

In this configuration, it is possible to acquire both of the update data for updating the camera body data and the update data for updating the camera head data, and to transmit only the update data for updating the camera head data to the camera head.

Meanwhile, the camera body preferably includes a medium accessing section which fits a portable storage medium detachably and accesses the portable storage medium fitted thereto, and acquiring section preferably acquires the update data by causing the medium accessing section to read the update data out of the portable storage medium fitted to the medium access section and storing the update data.

In this configuration, the camera body can acquire the update data for the camera head data and transmit the update data to the camera head easily.

Meanwhile, a camera body of the present invention interchangeably fits a camera head which is provided with a photographic optical system and an image pickup device and is configured to generate image signals in accordance with given camera head data. The camera body is configured to receive the image signals from the camera head, and to perform signal processing in accordance with given camera body data. Here, the camera body includes an acquiring section which acquires update data for updating the camera head data, and a transmitting section which transmits the update data acquired by the acquiring section to the camera head.

The camera body of the present invention is configured to transmit the acquired update data for updating the camera head data to the camera head. Accordingly, the camera head can update the camera head data heretofore in operation with the received update data. Therefore, when any camera head is fitted to the camera body, it is possible to update the program on the camera head's side without adding a special device to the camera head's side.

In addition, a camera head of the present invention is fitted interchangeably to a camera body which receives image signals and performs signal processing in accordance with given camera body data, and is provided with a photographic optical system and an image pickup device. Moreover, the camera head is configured to generate the image signals in accordance with given camera head data and to transmit the image signals to the camera body. Here, the camera head includes a receiving section which receives update data for the camera head data transmitted from the fitted camera body, and an updating section which updates the camera head data heretofore in operation with the update data received by the receiving section.

The camera head of the present invention is configured to receive the update data for updating the camera head data transmitted from the fitted camera body, and to update the camera head data heretofore in operation with the update data thus received. Therefore, it is possible to update a program on the camera head's side without adding a special device to the camera head's side.

According to the present invention, the camera system capable of updating the camera head data without adding a special device to the camera head's side irrespective of the type of the camera head fitted to the camera body, the camera body constituting the camera system, and the camera head interchangeably fitted to the camera body are realized.

BRIEF DESCRIPTION OF THE DRAWINGS

FIG. 10 is a view showing a second display screen in the setup mode.

DETAILED DESCRIPTION OF THE INVENTION

Now, an embodiment of the present invention will be described.

Figure 1:
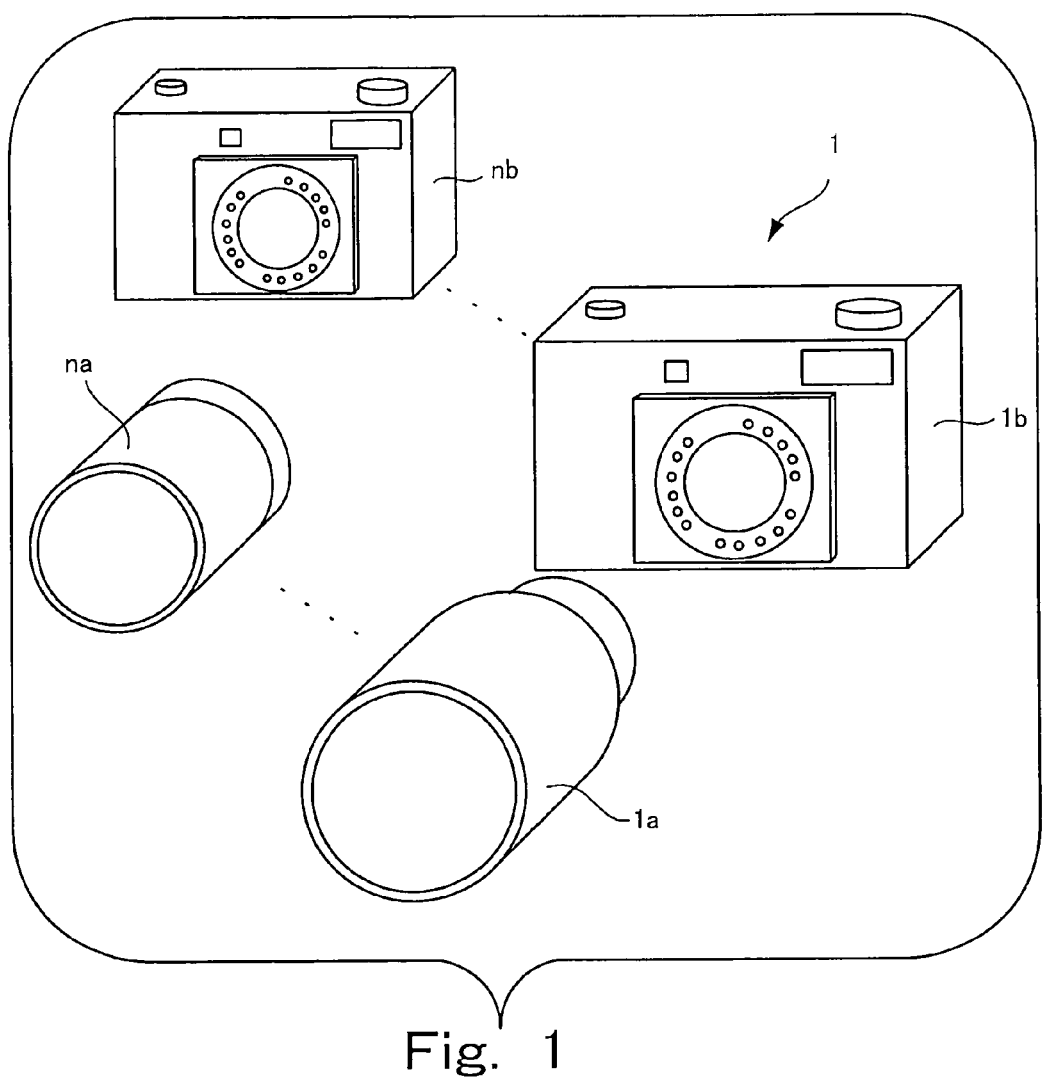
FIG. 1 is a view showing a camera system which is an embodiment of the present invention.

FIG. 1 is a view showing a camera system which is an embodiment of the present invention.

FIG. 1 shows a camera system including multiple types of camera heads 1a to na having different specifications of image pickup devices and the like, which are provided with photographic optical systems and the image pickup devices and are configured to generate image signals in accordance with multiple types of camera head data, and multiple types of camera bodies 1b to nb which are configured to fit one of the camera heads 1a to na interchangeably, to receive the image signals from the fitted camera head, and to perform signal processing in accordance with multiple types of camera body data. Here, description will be made a camera system 1 in which the camera head 1a out of the multiple types of camera heads 1a to na is interchangeably fitted to the camera body 1b out of the multiple types of camera bodies 1b to nb.

Figure 2:
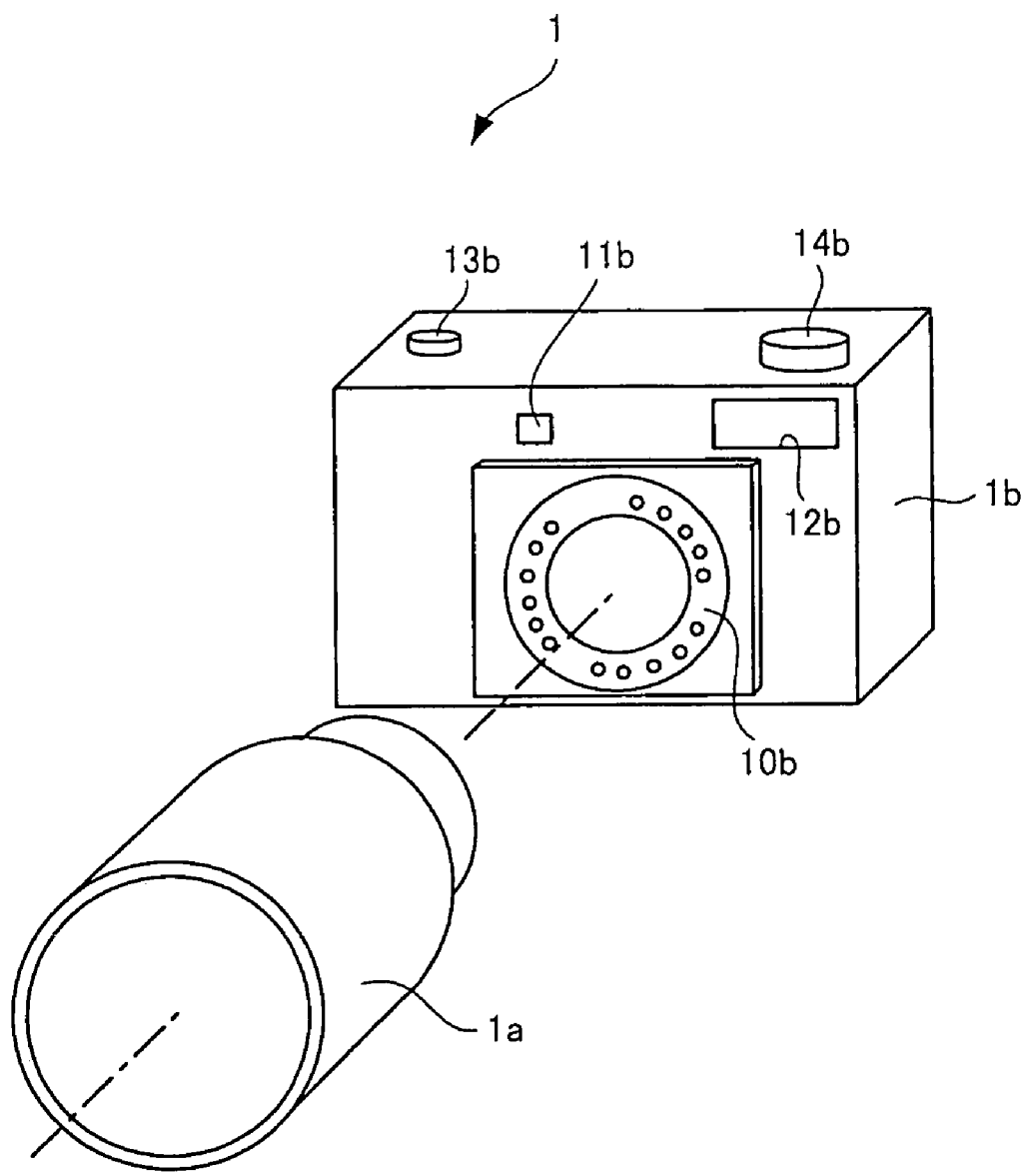
FIG. 2 is a view showing appearance of a camera system 1 of FIG. 1.

FIG. 2 is a view showing appearance of the camera system 1 of FIG. 1.

FIG. 2 shows the camera system 1 of FIG. 1 in the state immediately before the camera head 1a provided with the photographic optical system and the image pickup device is fitted to the camera body 1b, which is configured to fit the camera head 1a detachably, to receive the image signals from the camera head 1a, and to perform the signal processing.

This camera system 1 includes the camera head 1a provided with the photographic optical system and the image pickup device and configured to generate the image signals in accordance with the given camera head data, and the camera body 1b configured to fit the camera head 1a detachably, to receive the image signals from the camera head 1a, and to perform the signal processing in accordance with the given camera body data. Moreover, the camera system 1 can update the camera head data in the camera head 1a heretofore in operation with update data.

As shown in FIG. 2, a head mount 10b having numerous mount contacts is provided in the center of the camera body 1b. Meanwhile, a similar mounting section is formed on the camera head 1a as well. When the camera head 1a is mechanically fitted to the camera body 1b along a dashed line in the drawing so that positions of the mount contacts on the both sides are aligned with one another, the numerous mount contacts are respectively connected to one another, and the camera head 1a is electrically connected to the camera body 1b as well.

This camera system 1 is configured to locate a battery on the camera body 1b, so that electricity is supplied from the battery to the camera body 1b and also to the camera head 1a through the contacts for electricity among the numerous mount contacts formed on both of the camera head 1a and the camera body 1b. When the electricity is supplied from the battery in the camera body 1b through the contacts for electricity, both of the camera head 1a and the camera body 1b are activated.

Meanwhile, a release button 13b and a mode dial 14b are disposed on an upper surface of the camera body 1b. Moreover, an auto white balance (AWB) sensor 11b and a flash emission window 12b are provided on a front surface of the camera body 1b. Now, the mode dial 14b will be described.

Figure 3:
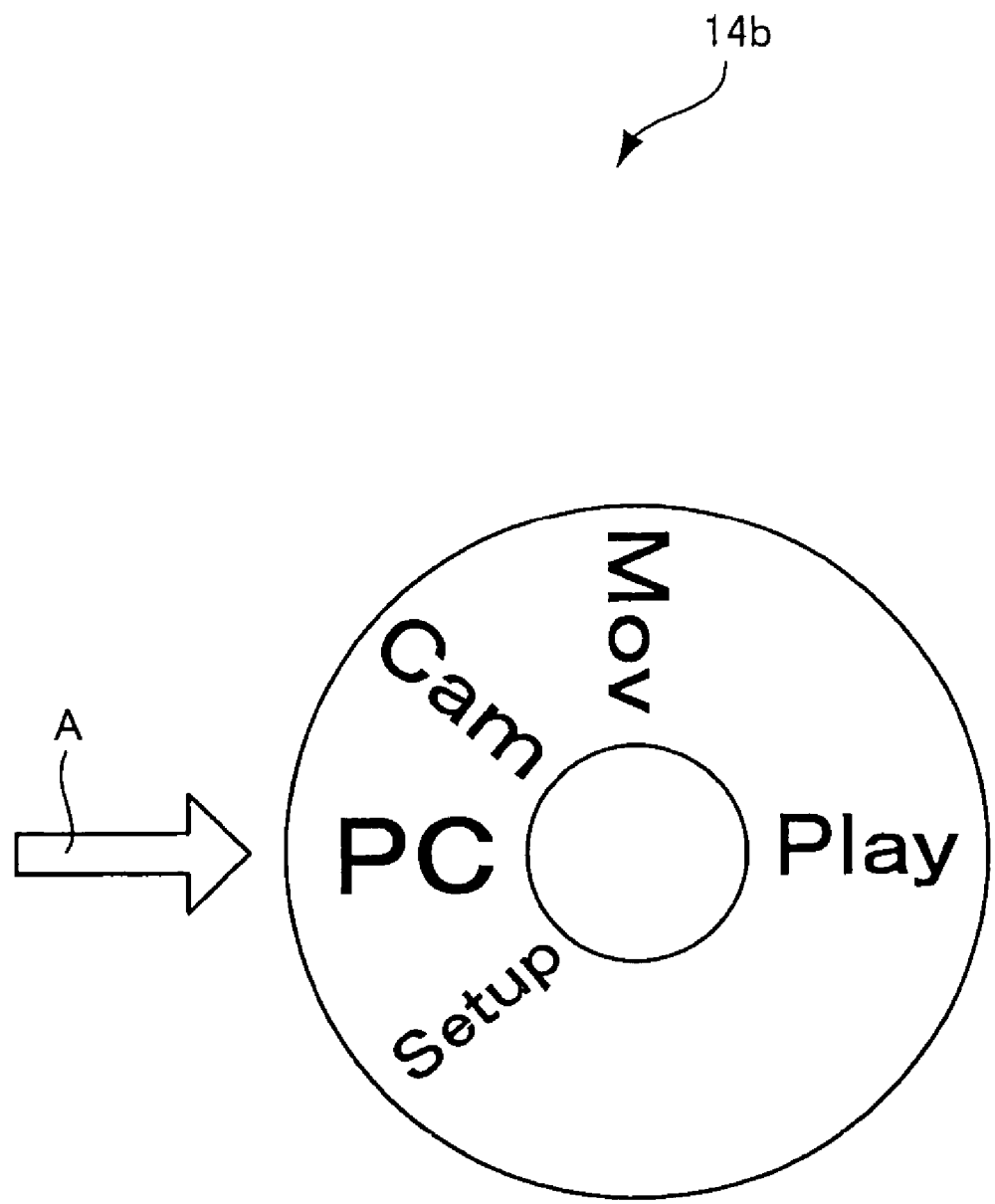
FIG. 3 is a view showing a mode dial of FIG. 2 which is viewed from above.

FIG. 3 is a view showing the mode dial of FIG. 2 which is viewed from above.

A character Cam indicating a still image shooting mode, a character Mov indicating a moving image shooting mode, a character Play indicating a playback mode, a character Setup indicating a setup mode, and a character PC indicating a PC mode for exchanging data to and from a personal computer are printed on the mode dial 14b shown in FIG. 3.

Using this mode dial 14b, it is possible to perform shooting under a shooting condition suitable for still image shooting by locating the character Cam in a position of an arrow A, and to perform shooting under a shooting condition suitable for moving image shooting by locating the character Mov in the position of the arrow A by rotating operations. Moreover, by locating the character Play in the position of the arrow A, image data such as a still image or a moving image stored in a memory card serving as a portable storage medium are read out, and the image based on the image data is displayed on a liquid crystal display (LCD) panel 22 to be described later. Meanwhile, various settings available by this camera system 1 can be set up by locating the character Setup in the position of the arrow A and operating an execution key and the like to be described later with reference to the LCD panel 22. In addition, it is possible to exchange data to and from the personal computer by locating the character PC in the position of the arrow A.

Figure 4:
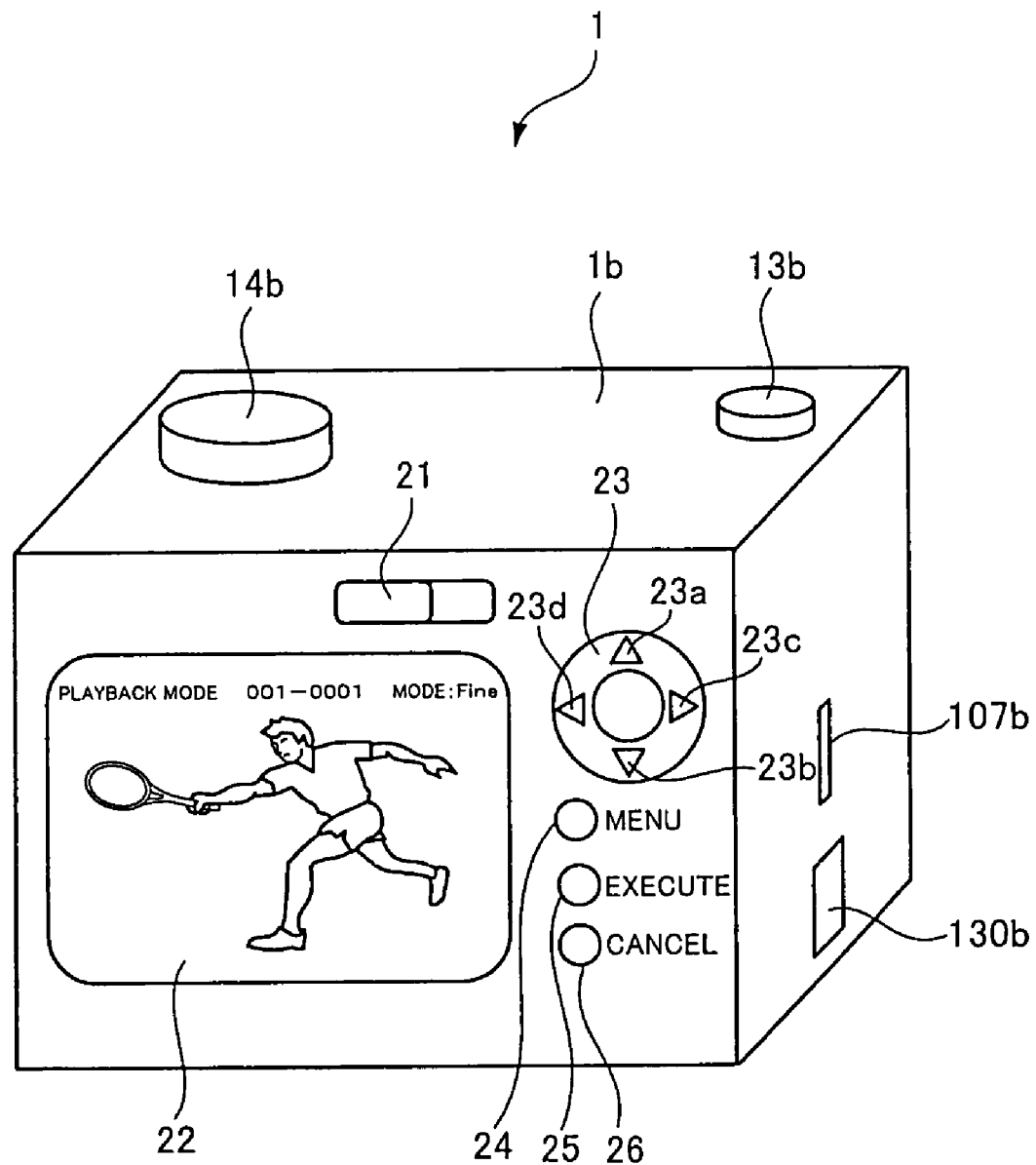
FIG. 4 is an external perspective view of the camera system of FIG. 2 viewed from obliquely above on a rear side.

FIG. 4 is an external perspective view of the camera system of FIG. 2 viewed from obliquely above on a rear side.

A sliding power switch 21 and the LCD panel 22 are provided on a rear surface of the camera body 1b constituting the camera system 1 of FIG. 4. The LCD panel 22 displays a through image in the still image shooting mode or the moving image shooting mode, an image based on the image data for a still image or a moving image stored in the memory card which is read out in the playback mode, a menu screen, and so forth.

Meanwhile, an arrow key 23 serving as an operation key is provided on an obliquely upper right side of the LCD panel 22. When the menu screen or the like is displayed on the LCD panel 22, it is possible to perform menu selection by operating four keys, namely, an up key 23a, a down key 23b, a right key 23c, and a left key 23d.

In addition, a menu key 24 for displaying the menu on the LCD panel 22, an execution key 25 to be operated to execute an item upon selection of any of items among numerous selection items in the menu screen displayed on the LCD panel 22 by use of any of the keys in the arrow key 23, and a cancel key 26 to be operated to cancel that selection are provided below the arrow key 23.

Meanwhile, a memory card slot 107b to which a memory card is detachably fitted is provided on a side surface of the camera body 1b shown in FIG. 4. This memory card stores the image data such as still images or moving images, update data for updating the camera head data in the camera head 1a (see FIG. 2) heretofore in operation, and update data for updating the camera body data in the camera body 1b heretofore in operation.

In addition, a universal serial bus (USB) connector 130b is provided on the side surface of this camera body 1b. A USB cable is connected thereto so as to receive the update data for updating the camera head data in the camera head 1a heretofore in operation from the personal computer or the like that includes a USB connector. In the camera system 1 of this embodiment, it is possible to transmit the update data for updating the camera head data in the camera head 1a heretofore in operation to the camera head 1a through the memory card slot 107b or the USB connector 130b. Details will be described below.

Firstly, internal configurations of the camera head 1a and the camera body 1b will be described with reference to FIG. 5.

Figure 5:
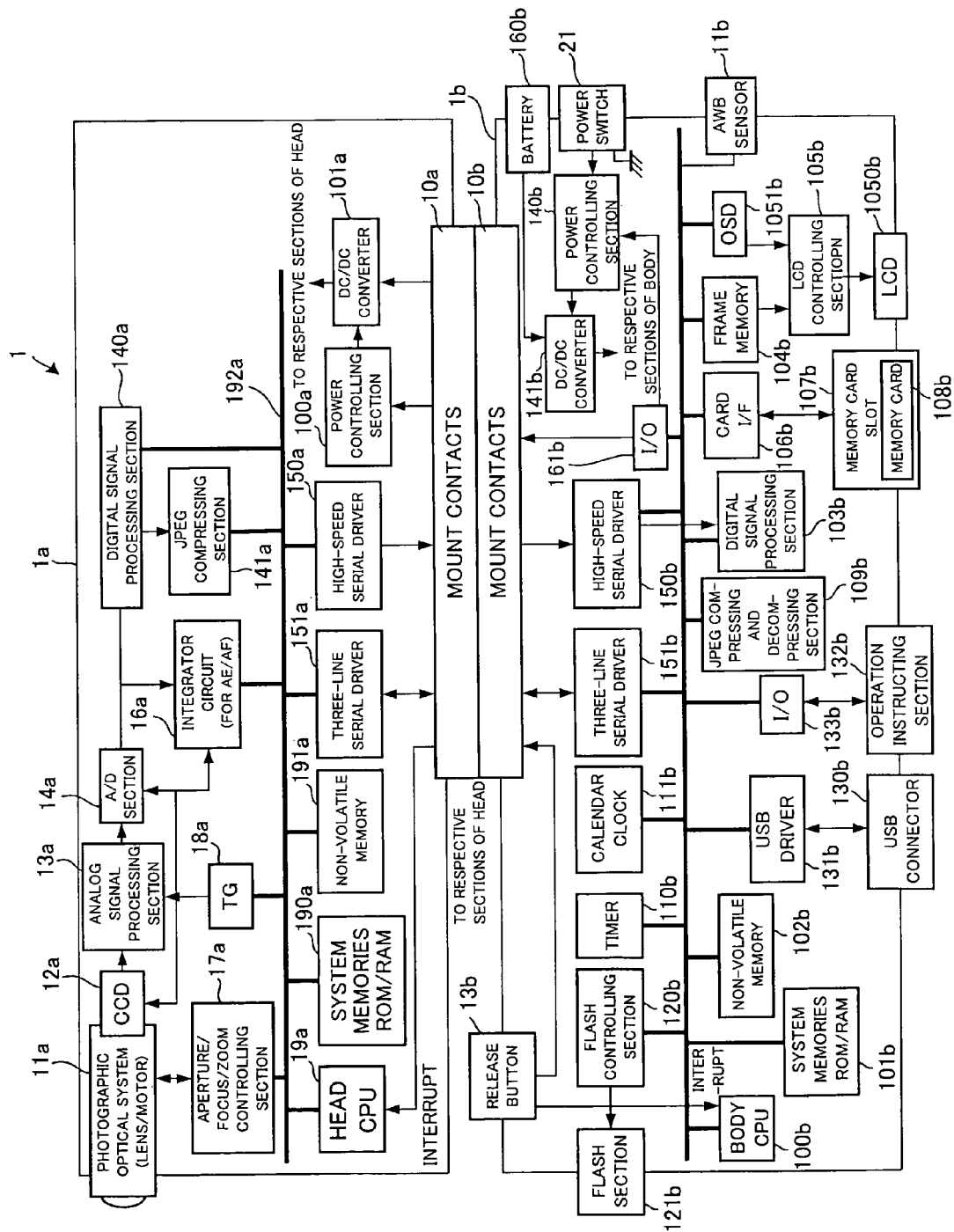
FIG. 5 is a block diagram showing a configuration of an electrical system when a camera head is fitted to a camera body.

FIG. 5 is a block diagram showing a configuration of an electrical system when the camera head is fitted to the camera body.

The configuration of the camera head 1a is illustrated on an upper part of FIG. 5, and the configuration of the camera body 1b is illustrated on a lower part of FIG. 5, respectively. Firstly, the configuration of the camera head 1a will be described.

The camera head 1a constituting the camera system 1 of this embodiment is operated by being fitted to the camera body 1b and receiving the power supply from a battery 160b included in the camera body 1b. Here, description will be made on the assumption that the camera head 1a is fitted to the camera body 1b.

The camera head 1a, which is fitted to the camera body 1b as shown in FIG. 5, includes a photographic optical system 11a and an image pickup device (hereinafter referred to as a CCD because a charge coupled device solid-state image pickup device is applied hereto) 12a. An imaging lens, an aperture, and the like are arranged inside the photographic optical system 11a. The imaging lens inside the photographic optical system 11a provides an image of a subject onto the CCD 12a, and the CCD 12a generates the image data. The image data generated by this CCD 12a are outputted to an analog signal processing section 13a. After the analog signal processing section 13a performs processing such as noise reduction, an analog/digital (A/D) section 14a at a subsequent stage converts analog image signals into digital image signals. Moreover, the image signals converted into the digital signals are supplied to a digital signal processing section 140a at a subsequent stage, and are subjected to given digital signal processing. The image signals subjected to this signal processing are supplied to a high-speed serial driver 150a through a data bus 192a without modification. Alternatively, the image signals are supplied to a Joint Experts Photographic Group (JPEG) compressing section 141a and are subjected to JPEG compression by the JPEG compressing section 141a. Then, the image signals subjected to the JPEG compression processing are supplied to the high-speed serial driver 150a.

The image signals to pass through this high-speed serial driver 150a and to be supplied to the camera body 1b include the following three types of image signals, namely, an image signal for a through image (hereinafter referred to as a through image signal) for displaying the subject captured by the imaging lens inside the photographic optical system in the state where either the still image shooting mode or the moving image shooting mode is selected by the mode dial 14b, an image signal representing a still image (hereinafter referred to as a still image signal) obtained by operating the release button 13b in the state of selecting the still image shooting mode, and an image signal representing a moving image (hereinafter referred to as a moving image signal) obtained by operating the release button 13b in the state of selecting the moving image shooting mode. One of these image signals is transmitted to the camera body 1b through the high-speed serial driver 150a upon a request from the camera body 1b.

In the meantime, the image signals converted into the digital signals by the A/D section 14a are also supplied to an integrator circuit 16a which is located at a subsequent stage to the A/D section 14a. This integrator circuit 16a bears an auto focus (hereinafter referred to as AF) function and an auto exposure (hereinafter referred to as AE) function. Luminance of the subject for activating the AE function and a distance of the subject for activating the AF function are measured by this integrator circuit 16a. The distance and the luminance of the subject measured by the integrator circuit 16a are supplied to an aperture/focus/zoom controlling section 17a through a data bus 192a, whereby a diameter of the aperture inside the photographic optical system or a position of a focusing lens inside the photographic optical system is adjusted by the aperture/focus/zoom controlling section 17a. By applying this configuration, the AF and the AE become active every time the lens inside the photographic optical system included in this camera head 1a is oriented to a different subject. Accordingly, the focus and the luminance are adjusted instantaneously, and the image data representing the well-focused subject are generated by the CCD 12a and outputted from the CCD 12a. These CCD 12a, the analog signal processing section 13a, the A/D section 14a, and the integrator circuit 16a are operated synchronously with a timing signal from a timing generator (hereinafter referred to as the TG) 18a.

A program for initialization, information such as a name of a manufacturer, a name of a product type or a version, and an update program for updating a program for realizing a function unique to the camera head 1a are stored in a read-only memory (ROM) of system memories 190a. Meanwhile, a random access memory (RAM) of the system memories 190a includes a work area when executing the programs.

The program for realizing the function unique to the camera head 1a is stored in a non-volatile memory 191a.

A head CPU 19a transfers the program stored in the non-volatile memory 191a to the RAM of the system memories 190a in accordance with procedures of the program for initialization stored in the ROM of the system memories 190a, and controls the entire camera head 1a in accordance with the transferred program. Moreover, the head CPU 19a updates the camera head data constituting the program heretofore in operation, which is stored in the non-volatile memory 191a, with the update data transmitted from the camera body 1b. Here, the head CPU 19a plays a role as an updating section constituting the camera head of the present invention.

In addition, three-line serial drivers 151a and 151b for driving three-line serial buses are disposed in both of the camera head 1a and the camera body 1b. Commands are exchanged from the camera body 1b to the camera head 1a or from the camera head 1a to the camera body 1b through the serial buses driven by the both drivers. When a command corresponding to a request for transmitting any of the through image signal, the still image signal, and the moving image signal is transmitted from the camera body 1b via the three-line serial driver 151a, for example, the relevant image signal is transmitted to the camera body 1b by use of the high-speed serial driver 150a which includes the high-speed serial bus faster than the three-line serial bus of the three-line serial driver 151a.

Meanwhile, the update data for updating the camera head data from the camera body 1b is received by the three-line serial driver 151a. The received update data are processed by the head CPU 19a and stored in the non-volatile memory 191a as will be described later. Here, the three-line serial driver 151a corresponds to an example of a receiving section constituting the camera head of the present invention. The configuration of the camera head 1a has been described. Next, the configuration of the camera body 1b will be described below.

The operation of the camera body 1b is controlled entirely by a body CPU 100b in the camera body 1b as similar to the camera head 1a. Meanwhile, a program for initialization, information such as a name of a manufacturer, a name of a product type or a version, and an update program for updating a program for realizing a function unique to the camera body 1b are stored in a ROM of system memories 101b. Meanwhile, a RAM of the system memories 101b includes a work area when executing the programs.

Adjustment data unique to the camera body 1b and the program for realizing the function unique to the camera body 1b are stored in a non-volatile memory 102b.

The body CPU 100b transfers the program stored in the non-volatile memory 102b to the RAM of the system memories 101b in accordance with procedures of the program for initialization stored in the ROM of the system memories 101b, and controls the camera body 1b in accordance with the transferred program. Moreover, the body CPU 100b has a function to update the camera body data constituting the program heretofore in operation, which is stored in the non-volatile memory 102b, with the update data transmitted to the camera body 1b.

In this embodiment, as described previously, any of the three types of image signals including the through image signal, the still image signal, and the moving image signal is transmitted from the camera head 1a. For example, in the case of the through image which is subjected to JPEG compression and is transmitted, the image signal is decompressed by a JPEG compressing and decompressing section 109b in the camera body 1b and is supplied to a signal processing section 103b. Then, the image signal is converted into the through image signal for display by the signal processing section 103b. The through image signal for display is stored in a frame memory 104b. The through image signal stored in the frame memory 104b is read out by an LCD controlling section 105b, and the through image based on the through image signal is displayed on an LCD panel of an LCD 1050b. Information from an on screen display (OSD) 1051b is also supplied to the LCD controlling section 105b. Accordingly, a selection menu and the like are displayed on this LCD panel together with the through image.

Meanwhile, in addition to the portions for processing the image signals, the camera body 1b is provided with a timer 110b and a calendar clock 111b which generate data for displaying time and date information on the LCD panel through the OSD 1051b.

Moreover, the camera body 1b is provided with a card interface (I/F) 106b, which detachably fits a memory card 108b serving as a portable storage medium by use of the memory card slot 107b and accesses the fitted memory card 108b. The still image data, the moving image data, the update data for updating the camera head data, and the update data for updating the camera body data are stored in the memory card 108b. Here, the card I/F 106b corresponds to an example of a medium accessing section of the present invention.

Meanwhile, the body CPU 100b acquires the update data for updating the camera head data and the update data for updating the camera body data, which are stored in the memory card 108b. Here, the body CPU 100b serves as an acquiring section constituting the camera body of the present invention. The update data acquired by the body CPU 100b are transmitted to the camera head 1a by use of the three-line serial driver 151b. This three-line serial driver 151b corresponds to an example of a transmitting section constituting the camera body of the present invention.

In addition, the body CPU 100b serves as a type identifying section which identifies the type of the camera head 1a fitted to the camera body 1b. Here, the three-line serial driver 151b transmits the update data acquired by the body CPU 100b to the camera head 1a only when the update data are compatible with the type of the camera head identified by the body CPU 100b.

To be more precise, the body CPU 100b serves as a version identifying section which identifies a version of the camera head data written in the camera head 1a fitted to the camera body 1b. Here, the three-line serial driver 151b transmits the update data acquired by the body CPU 100b to the camera head 1a only when the update data are of a newer version than the version identified by the body CPU 100b.

Meanwhile, the body CPU 100b is configured to acquire the update data irrespective of whether the data constitute the update data for updating the camera head data or the update data for updating the camera body data. Moreover, this camera body 1b judges whether the update data acquired by the body CPU 100b constitute the update data for updating the camera head data or the update data for updating the camera body data by use of a program stored in the ROM of the system memories 101b. Meanwhile, the three-line serial driver 151b transmits the update data for updating the camera head data to the camera head 1a when the update data acquired by the body CPU 100b are judged as the update data for updating the camera head data.

Furthermore, the body CPU 100b acquires the update data by allowing the card I/F 106b to read the update data out of the memory card 108b storing the update data, which is fitted to the card I/F 106b.

Meanwhile, an operation instructing section 132b provided with the release button 13b, the mode dial 14b, the arrow key 23, the menu key 24, the execution key 25, and the cancel key 26 for giving operational instructions are arranged on the camera body 1b. An operational instruction from this operation instructing section 132b is supplied to the body CPU 100b through an input/output section (I/O) 133b, and this body CPU 100b performs processing in response to the operational instruction. However, the release button 13b is connected directly to interruption terminals of both of the body CPU 100b and the head CPU 19a. Accordingly, both of the CPUs 19a and 100b are interrupted by pushing the release button 13b so as to start a still image processing program or a moving image processing program.

Here, electricity is supplied from the battery 160b located in the camera body 1b to respective sections of the camera body 1b through a DC/DC converter 141b of the camera body 1b. The electricity is also supplied from the battery 160b to respective sections of the head through a DC/DC converter 101a of the camera head 1a. These DC/DC converters 101a and 141b are controlled by power controlling sections 100a and 140b included in the camera head 1a and the camera body 1b, respectively. When an instruction of turning on power is given to the power controlling section 140b of the camera body 1b by a sliding operation of the power switch 21, an output instruction is supplied from the power controlling section 140b to the DC/DC converter 141b of the camera body. At the same time, an output instruction is also supplied to the power controlling section 100a of the camera head 1b through an I/O 161b. In this way, the electricity is supplied from the DC/DC converter 101a to the respective sections of the head.

Meanwhile, the camera body 1b is provided with a USB driver 131b and the USB connector 130b for connection to a personal computer as an external device. Here, the USB driver 131b corresponds to another example of the medium accessing section of the present invention. It is possible to transmit the update data for updating the camera head data or the camera body data from the personal computer.

In the camera system 1 of this embodiment, upon transmission of the update data for updating the camera head data from the camera body 1b to the camera head 1a, it is possible to transmit the update data for updating the camera head data stored in the memory card 108b via the memory card slot 107b and the card I/F 106b. Alternatively, it is possible to transmit the update data for updating the camera head data from the personal computer via the USB connector 130b and the USB driver 131b.

First, the case of transmitting the update data for updating the camera head data stored in the memory card 108b will be described.

Figure 6:
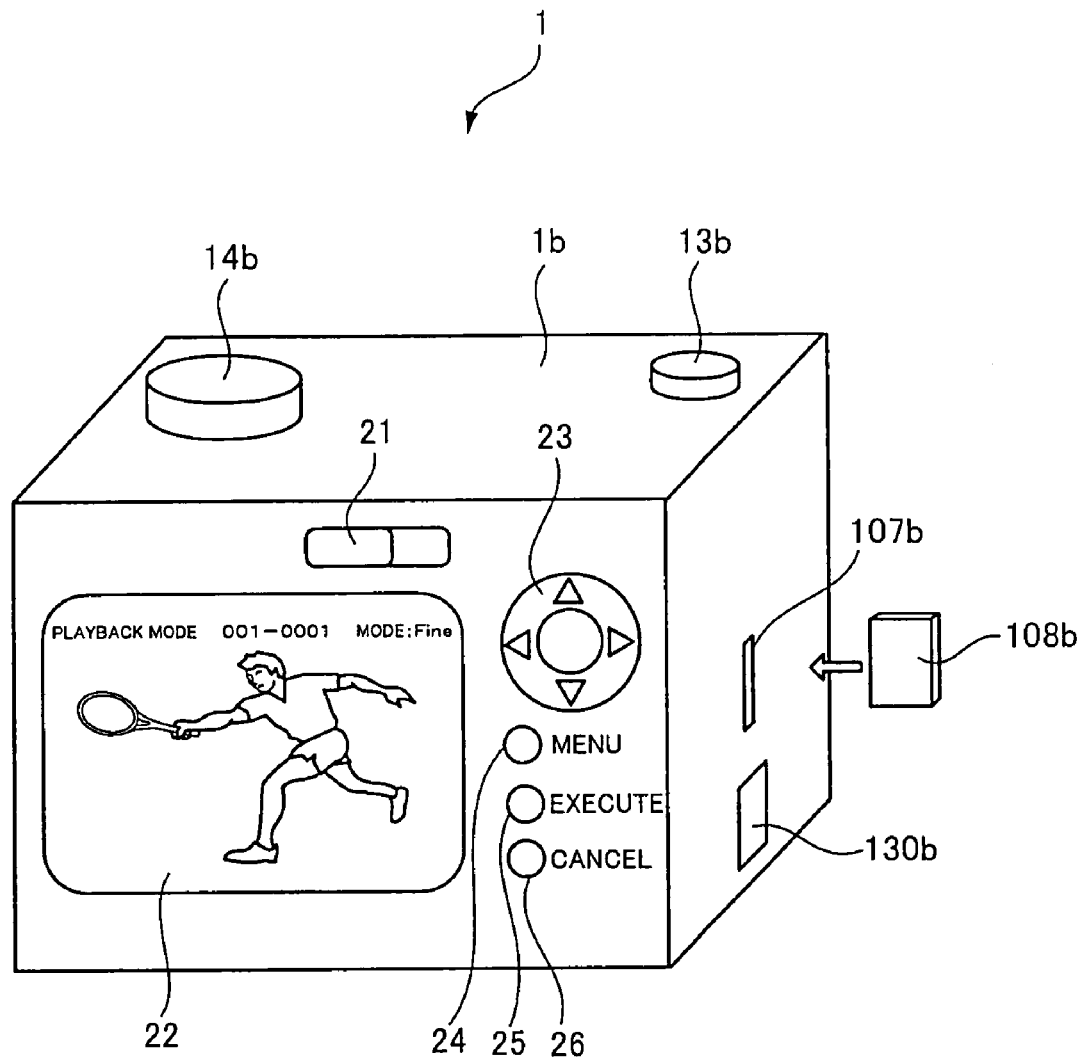
FIG. 6 is a view showing an aspect where a memory card is fitted to a memory card slot, which is disposed on a camera body constituting the camera system of FIG. 4.

FIG. 6 is a view showing an aspect where the memory card is fitted to the memory card slot, which is disposed on the camera body constituting the camera system shown in FIG. 4.

The memory card 108b is fitted to the memory card slot 107b disposed on the camera body 1b shown in FIG. 6. The update data for updating the camera head data are stored in this memory card 108b. Here, a structure of the update data for updating the camera head data will be described.

Figure 7:
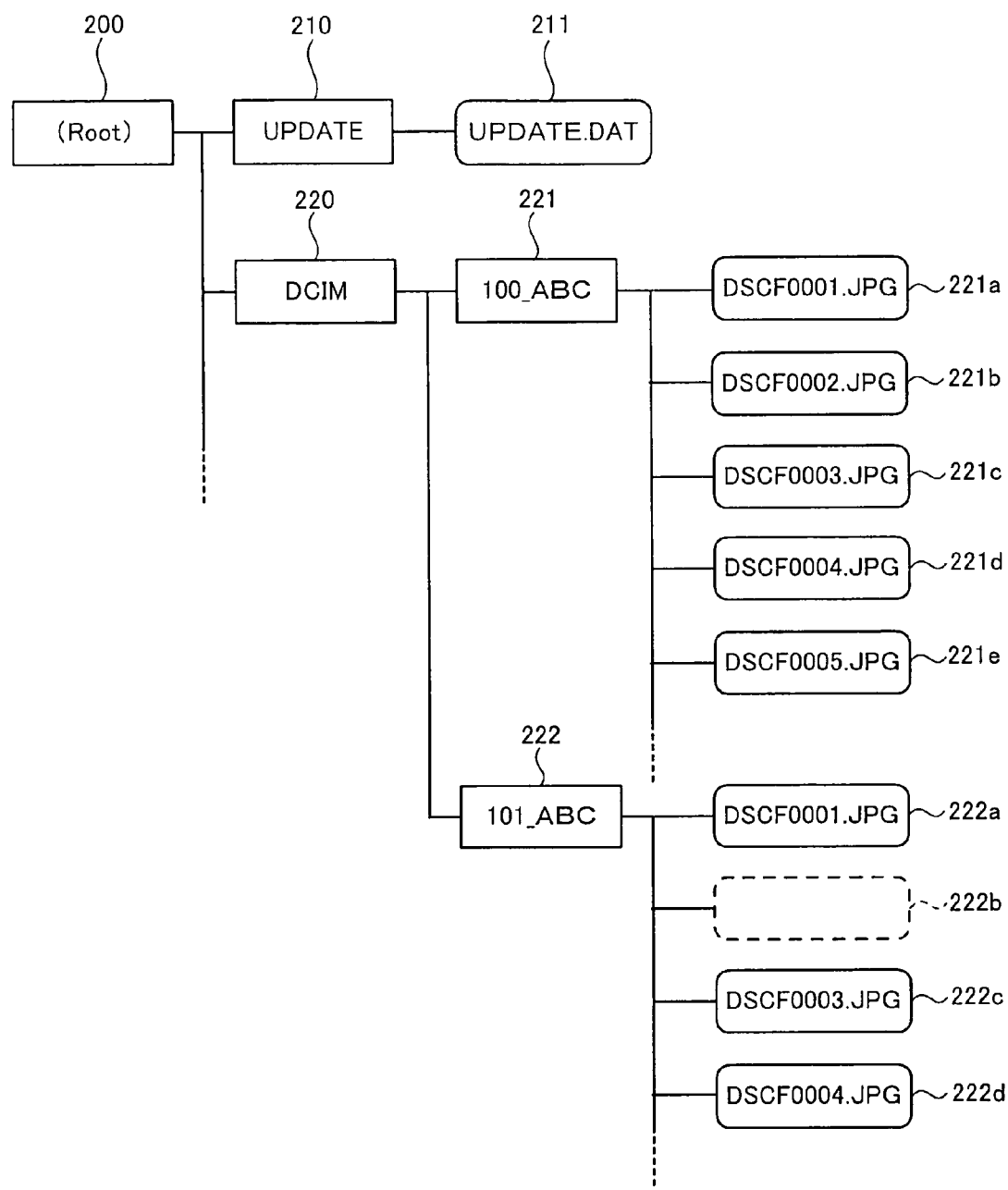
FIG. 7 is a view showing a storage structure of an update data file for updating camera head data.

FIG. 7 is a view showing a storage structure of an update data file for updating camera head data.

FIG. 7 illustrates a folder 200 (folder name Root) representing the entire contents of the memory card 108b. This main folder 200 includes an update folder 210 (folder name UPDATE) and an image data folder 220 (folder name DCIM).

An update file 211 including the update data for updating the camera head data is stored in the update folder 210. As shown herein, the update file 211 is stored in the given folder 210 in the memory card 108b by a given file name of UPDATE.DAT.

Meanwhile, the image data folder 220 includes a first image data folder 221 (folder name 100_ABC) and a second image data folder 222 (folder name 101_ABC). JPEG files 221a, 221b, 221c, 221d, and 221e are stored in the first image data folder 221. Meanwhile, JPEG files 222a, 222c, and 22d, and a JPEG file 221b without a file number are stored in the second image data folder 222.

Figure 8:
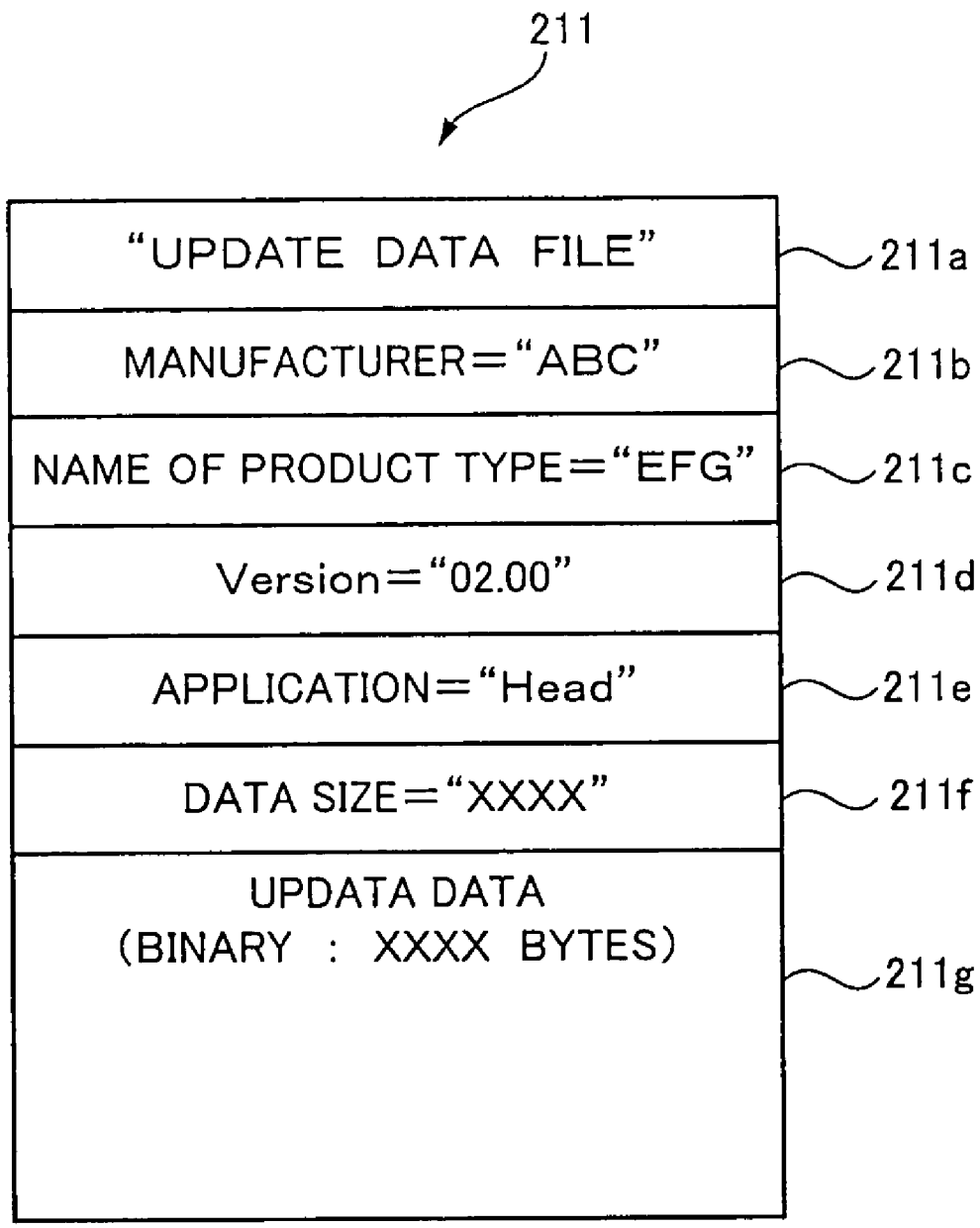
FIG. 8 is a view showing a structure of the update file of FIG. 7.

FIG. 8 is a view showing a structure of the update file shown in FIG. 7.

This update file 211 includes a region 211a for storing data "UPDATE DATA FILE" indicating the update file, a region 211b for storing data "ABC" indicating the name of the manufacturer, a region 211c for storing data "EFG" indicating the name of the product type, a region 211d for storing data "02.00" indicating the version, a region 211e for storing application data "Head" indicating whether the update program is designed for the camera head or the camera body, a region 211f for storing data "XXXX" indicating the size of the data, and a region 211g for storing the update data (binary: XXXX bytes).

Now, the setup mode will be described.

Figure 9:
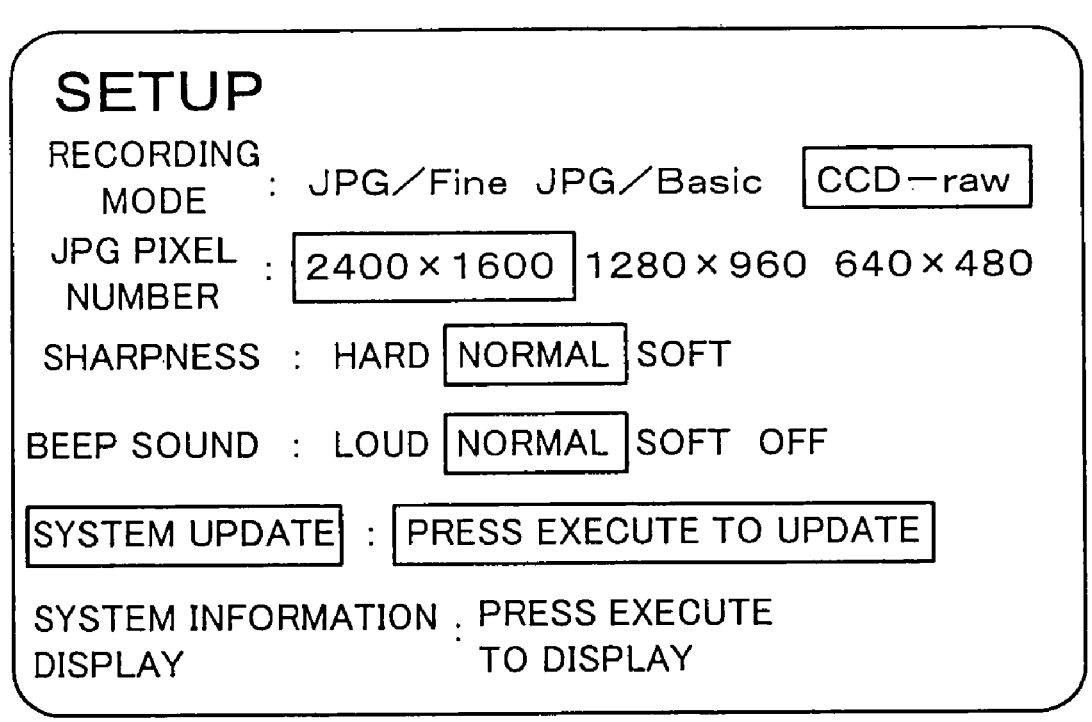
FIG. 9 is a view showing a first display screen in a setup mode.

FIG. 9 is a view showing a first display screen in a setup mode.

When the mode dial 14b is operated and positioned to the setup mode, the setup mode is initiated and the screen shown in FIG. 9 is displayed on the LCD panel 22. As shown in FIG. 9, items "recording mode", "JPG pixel number", "sharpness", "beep sound", "system update", and "system information display" are arranged from the top. Here, the item "system update" is selected.

The item "recording mode" includes a JPG/Fine mode having a relatively large data size per image when subjected to JPEG compression, a JPG/Basic mode having a relatively small data size per image when subjected to JPEG compression, and a CCD-raw mode for directly recording data obtained by the CCD without JPEG compression. Here, the CCD-raw mode is selected.

The item "JPG pixel number" includes a pixel number of 2400×1600 which can obtain a high-resolution image, a pixel number of 1280×960 which can obtain an image at normal resolution, and a pixel number of 640×480 which is equal to ¼ of the pixel number of 1280×960. Here, the pixel number of 2400×1600 is selected.

The item "sharpness" includes a hard mode suitable for shooting an image while enhancing edges and thereby sharpening buildings, characters, and the like, a normal mode for performing suitable sharpness processing for normal shooting, and a soft mode suitable for shooting a soft image of a person by softening edges. Here, the normal mode is selected.

The item "beep sound" includes a loud mode for generating a loud operating sound, a normal mode for generating a normal operating sound, a soft mode for generating a soft operating sound, and an off mode for generating no sound. Here, the normal mode is selected.

The item "system update" is provided for updating the programs for the camera body and the camera head. When this item "system update" is selected, an "press EXECUTE to update" sign is displayed. The display transits to a second display screen in the setup mode to be described later by pressing the execution key 25 (see FIG. 4).

The item "system information display" is provided for displaying a variety of information on the camera system 1 including the camera body 1b and the camera head 1a. When this item "system information display" is selected, a sign "press EXECUTE to display" is displayed. The variety of information on the camera system 1 is displayed by pressing the execution key 25.

FIG. 10 is a view showing the second display screen in the setup mode.

This second display screen is equivalent to a screen for confirmation of the system upgrade, which is displayed by selecting the item "system upgrade" shown in FIG. 9 and pressing the execution key 25.

This screen displays that the content of update is targeted for the head, that the manufacturer is ABC, that the product type is EFG, that the current version (the version of the program in the camera head 1a) is 01.50, and that the version of the update is 02.00. An operator confirms these pieces of information. When the information is acceptable, the operator selects the "EXECUTE" field and presses the execution key 25. In addition, when canceling updating the program, the operator selects the "CANCEL" field and press the execution key 25.

Figure 11:
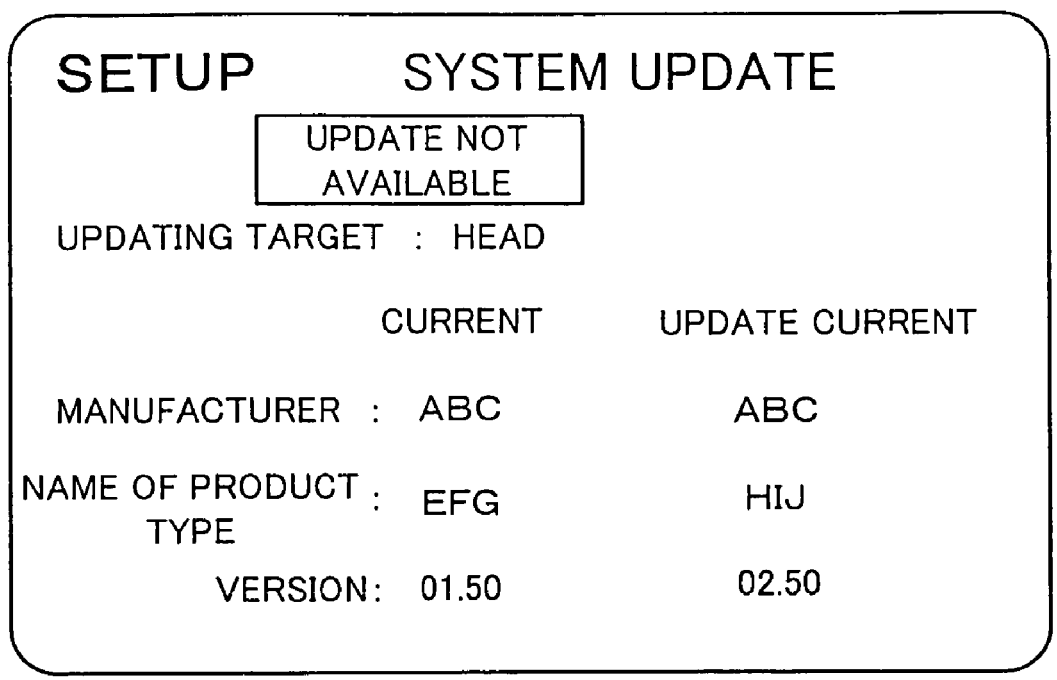
FIG. 11 is a view showing a third display screen in the setup mode.

FIG. 11 is a view showing a third display screen in the setup mode.

This third display screen is an alert screen which is displayed in the case where the item "system update" shown in FIG. 9 is selected and the execution key 25 is pressed and when the name of the manufacturer and the name of the product type included in the update file are different from a name of a manufacturer and a name of a product type of the opponent camera head 1a.

This screen displays that the head is the updating target. Here, the current name of the manufacturer is ABC and the content of update (the name of the manufacturer included in the update file) is also ABC. Therefore, the names of the manufacturers coincide with each other, and there is no problem concerning the manufacturer. On the contrary, concerning the product type, the current name of the product type is EFG while the content of update (the name of the product type included in the update file) is HIJ. Therefore, the names of the product types do not coincide with each other. Accordingly, an alert display "UPDATE NOT AVAILABLE" is shown on the screen. This may be attributable to a wrong memory card 108b. Therefore, the operator will take action such as replacement with another memory card.

Next, a flow from the point of initiation of the setup mode to the point of writing the update file stored in the memory card 108b on the camera body's side into the non-volatile memory on the camera head's side will be described in the order of events while showing exchanges between the camera body 1b and the camera head 1a.

Figure 12:
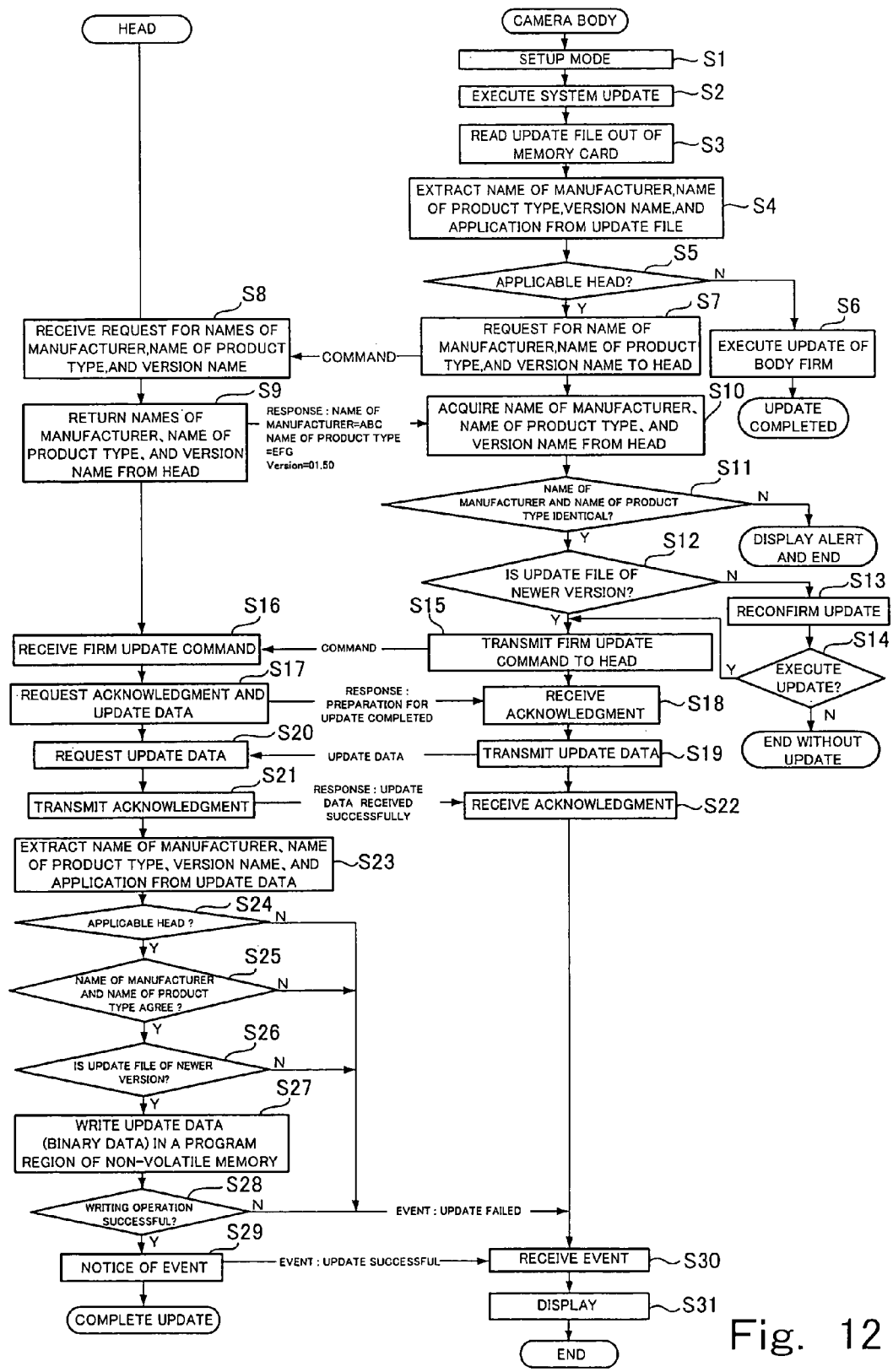
FIG. 12 is a view for explaining transition of procedures from initiation of the setup mode until an update file stored in the memory card on the camera body's side is written in a non-volatile memory on the camera head's side.

FIG. 12 is a view for explaining transition of procedures from initiation of the setup mode until the update file stored in the memory card on the camera body's side is written in the non-volatile memory on the camera head's side.

The contents of exchanges between the camera body 1b and the camera head 1a are written in FIG. 12 using characters. Moreover, the contents written with the characters are further indicated by arrows so as to explain whether each of the contents is transmitted from the camera body to the camera head or from the camera head to the camera body.

The body CPU executes respective processing steps on behalf of the body while the head CPU executes processing steps on behalf of the head.

The setup mode is initiated and the display screen in the setup mode as shown in FIG. 10 is displayed on the LCD panel in step S1. Subsequently, the execution key is pressed to execute the system update in step S2. Then, the update file is read out of the memory card in step S3. Further, the respective data for the name of the manufacturer, the name of the product type, and the version name included in the update file, and the application data indicating whether this update file is designed for the head or the camera body are extracted in step S4. Then, the process goes to step S5.

In step S5, a judgment is made whether the update file is applicable to the head or the camera body. When the judgment is made that the update file is applicable to the camera body, the process goes to step S6 where the program in the camera body is updated and the system upgrade is completed.

On the contrary, the process goes to step S7 when the judgment is made that the update file is applicable to the camera head. In step S7, a request command for requesting the respective data of the name of the manufacturer, the name of the product type, and the version name included in the camera head is issued to the camera head through the three-line serial driver.

On the camera head's side, the request command for requesting the respective data of the name of the manufacturer, the name of the product type, and the version name is received in step S8. Next, the respective data of the name of the manufacturer (ABC), the name of the product type (EFG), and the version name (01.50) are returned to the camera body through the three-line serial driver in step S9.

On the camera body's side, the respective data of the name of the manufacturer, the name of the product type, and the version name are received from the camera head's side in step S10. Then, the process goes to step S11.

In step S11, a judgment is made whether or not the name of the manufacturer and the name of the product type agree. When the judgment is made that the name of the manufacturer and the name of the product type do not agree, the alert "UPDATE NOT AVAILABLE" as shown in FIG. 11 is displayed on the LCD panel and the process is completed. On the other hand, the process goes to step S12 when the judgment is made that the name of the manufacturer and the name of the product type agree.

In step S12, a judgment is made whether the version of the update file is newer or not. When the judgment is made that the version of the update file is newer, the process goes to step S15 to be described later. On the other hand, the process goes to step S13 when the judgment is made that the version of the update file is either the same or older. In step S13, a display for performing reconfirmation of updating is displayed on the LCD panel, and then the process goes to step S14. In step S14, a judgment is made whether or not the update with that version is executed. When the update is not executed, the process is completed at that point. When executing the update, the process goes to step S15.

In step S15, a command for updating the program is transmitted to the camera head. On the camera head's side, the command for updating the program is received in step S16. Next, an acknowledgment of receipt of this command and a message indicating completion of preparation for requesting the update data are returned to the camera body, and then the process goes to step S20. In step S20, the camera head stands by until the update data are transmitted from the camera body.

On the camera body's side, the acknowledgment and the message indicating completion of preparation for requesting the update data are received in step S18, and then the process goes to step S19. The update data are transmitted in step S19, and the process goes to step S22. In step S22, the camera body stands by until another acknowledgment is received from the camera head.

On the camera head's side, the transmitted update data are received in step S20, and the process goes to step S21. In step S21, an acknowledgment of normal reception of the update data is returned. On the camera body's side, this acknowledgment is received in step S22, and the process goes to step S30.

Moreover, on the camera head's side, the respective data of the name of the manufacturer, the name of the product type, and the version name are extracted from the update data, and the process goes to step S24.

In step S24, a judgment is made whether or not the camera head corresponds to the applicable head. When the judgment is made that the camera head is not the applicable head, an event indicating the fact is transmitted to the camera body. On the other hand, the process goes to step S25 when the judgment is made that the camera head corresponds to the applicable head. In step S25, a judgment is made whether or not the name of the manufacturer and the name of the product type agree. When the judgment is made that the name of the manufacturer and the name of the product type do not agree, an event indicating the fact is transmitted to the camera body. When the judgment is made that the name of the manufacturer and the name of the product type agree, the process goes to step S26.

In step S26, a judgment is made whether or not the version of the update file is newer. When the judgment is made that the version of the update file is either the same or older, an event indicating the fact is transmitted to the camera body. On the other hand, when the judgment is made that the version of the update file is newer, the process goes to step S27. In step S27, the update data (the binary data) are written in a program region of the non-volatile memory. Thereafter, the process goes to step S28.

In step S28, a judgment is made whether or not the writing operation is successful. When the judgment is made that the writing operation is failed, an event indicating the fact is transmitted to the camera body. On the other hand, when the judgment is made that the writing operation is successful, the process goes to step S29. In step S29, an event indicating that the update is successful is transmitted to the camera body.

On the camera body's side, the event described is received in step S30 and the process goes to step S31. In step S31, the success or the failure of the update is displayed and then the process is completed.

Figure 13:
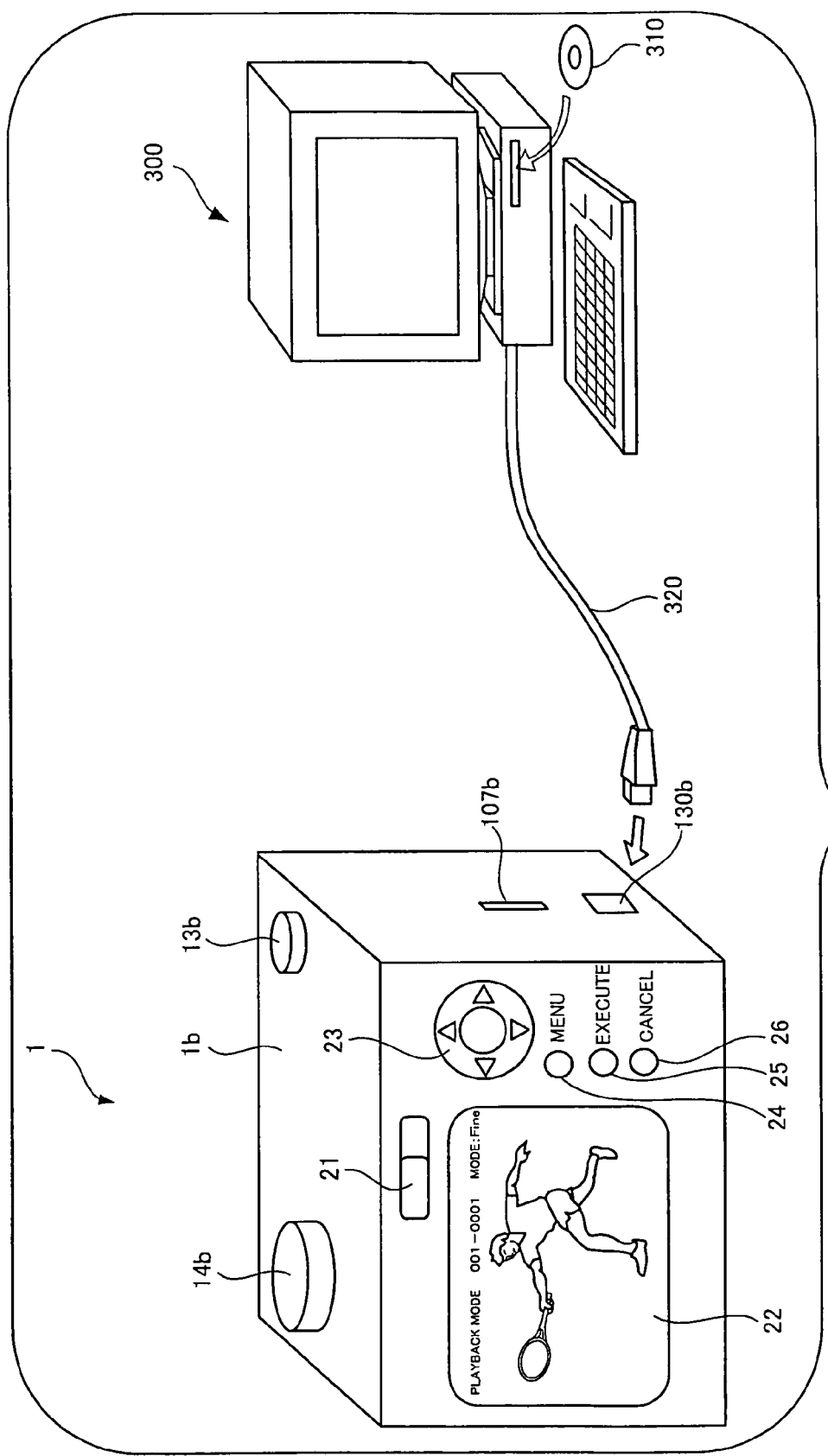
FIG. 13 is a view showing a configuration in which a personal computer (PC) is connected to the camera body constituting the camera system of FIG. 4 so that the update data can be acquired from the PC.

FIG. 13 is a view showing a configuration in which a personal computer (hereinafter referred to as a PC) is connected to the camera body constituting the camera system of FIG. 4 so that the update data can be acquired from the PC.

As shown in FIG. 13, the update file for updating the program in the camera system 1 can be acquired by connecting the camera body 1b to a PC 300 with a USB cable 320 and loading a compact disc read-only memory (CDROM) 310 on the PC 300. When the CDROM 310 is loaded on a CDROM slot of the PC 300, a program in the CDROM 310 is started and a download menu of the update file is displayed. Here, the update file in the CDROM 310 is downloaded to camera system 1 through the USB cable 320 by selecting the download menu and clicking an icon for executing the download with a mouse or the like. Here, instead of loading a medium such as the CDROM 310 on the PC 300, it is also possible to acquire the update file for updating the program in the camera system 1 through the Internet.

Now, a flow from the point of download of the update file from the PC 300 to the camera system 1 through the USB cable 320 to the point of writing the update file in the non-volatile memory of the camera head 1b will be described in the order of events while showing exchanges among the PC 300, the camera body 1b, and the camera head 1a.

Figure 14:
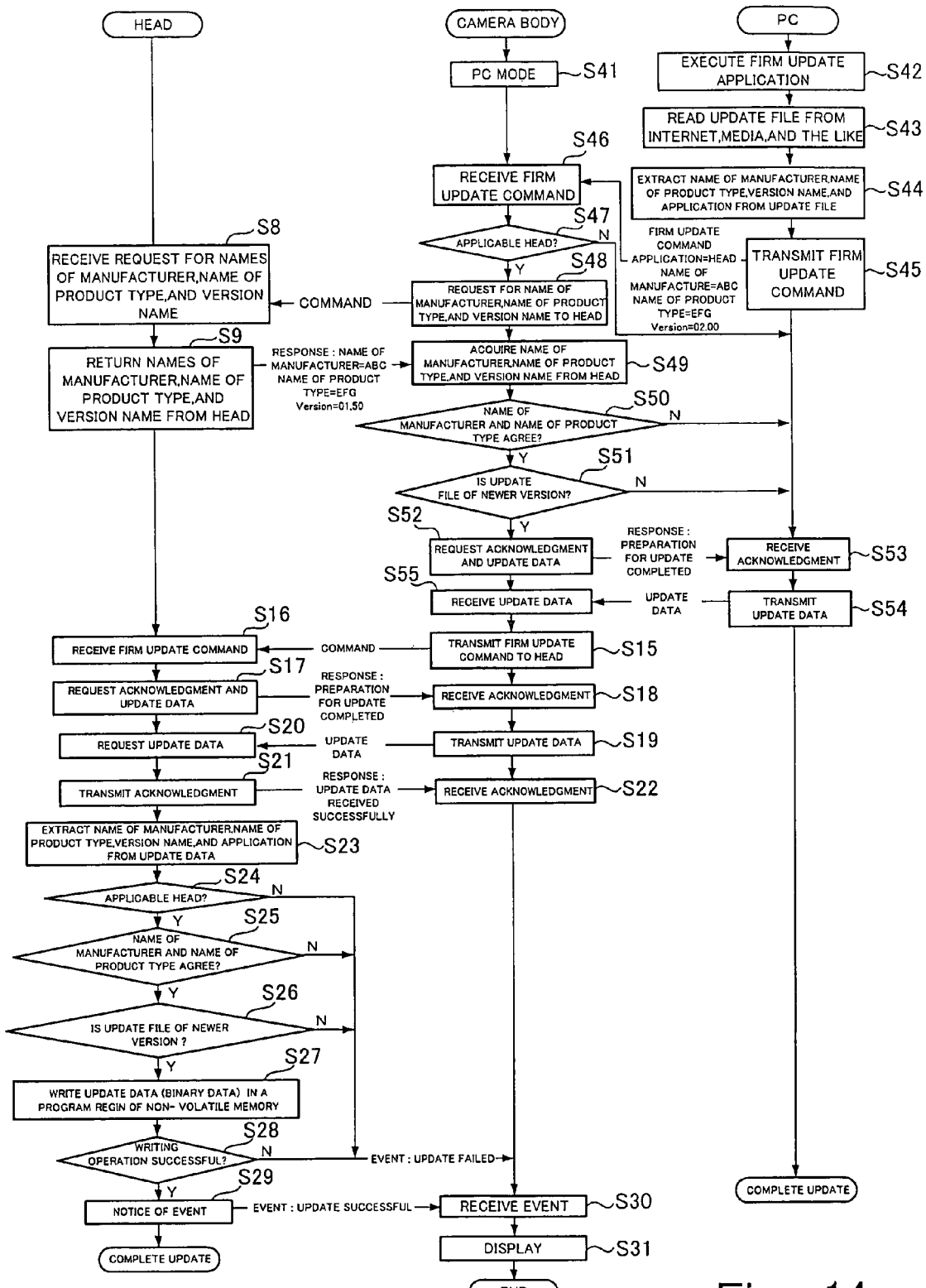
FIG. 14 is a view for explaining transition of procedures from reception of the update file from the PC's side by the camera body until the update file is further written in the non-volatile memory on the camera head's side.

FIG. 14 is a view for explaining transition of procedures from reception of the update file from the PC's side by the camera body until the update file is further written in the non-volatile memory on the camera head's side.

Here, steps of executing the same processing as the steps shown in FIG. 12 are designated by the same reference numerals, and different points will be described below.

Along with initiation on the PC's side, the body CPU executes respective processing steps on behalf of the body while the head CPU executes respective processing steps on behalf of the head.

On the body's side, the PC mode is set up by a rotating operation of the mode dial in step S41, and the process goes to step S46. On the PC's side, application software for updating a program in the camera system is executed in step S42. Next, in step S43, the update file is read into the PC from the Internet or other media, for example. Further, the respective data for the name of the manufacturer, the name of the product type, and the version name included in the update file, and the application data indicating whether this update file is designed for the head or the camera body are extracted in step S44. Then, the process goes to step S45.

In step S45, the respective data included in the update file, namely, the application (the head), the name of the manufacturer (ABC), the name of the product type (EFG), and the version name (02.00) are transmitted to the camera body collectively as a firm update command for updating the program.

On the camera body's side, the firm update command is received in step S46, and the process goes to step S47. In step S47, a judgment is made whether the firm update command is applicable to the head or the camera body. When the judgment is made that the firm update command is applicable to the camera body, a command indicating the fact is transmitted to the PC's side.

On the contrary, the process goes to step S48 when the judgment is made that the firm update command is applicable to the camera head. In step S48, a request command for requesting the respective data of the name of the manufacturer, the name of the product type, and the version name included in the camera head is issued to the camera head. The request command is received by the camera head's side in step S8. Further, the respective data of the name of the manufacturer (ABC), the name of the product type (EFG), and the version name (01.50) are returned to the camera body.

On the camera body's side, the respective data of the name of the manufacturer, the name of the product type, and the version name are acquired from the camera head in step S49. Then, the process goes to step S50.

In step S50, a judgment is made whether or not the name of the manufacturer and the name of the product type agree. When the judgment is made that the name of the manufacturer and the name of the product type do not agree, a command indicating the fact is transmitted to the PC's side. On the other hand, the process goes to step S51 when the judgment is made that the name of the manufacturer and the name of the product type agree.

In step S51, a judgment is made whether the version of the update file is newer or not. When the judgment is made that the version of the update file is either the same or older, a command indicating the fact is transmitted to the PC's side. On the other hand, the process goes to step S52 when the judgment is made that the version of the update file is newer. In step S52, an acknowledgment is returned to the PC's side and the update data is requested.

On the PC's side, the acknowledgement is received in step S53, and the process goes to step S54. In step S54, the update data is transmitted to the camera body.

On the camera body's side, the update data are received in step S55, and the process goes to step S15. The processing in step S15 and thereafter is the same as the processing described with reference to FIG. 12. Accordingly, explanation will be omitted. In this way, it is possible to transmit the update file from the PC's side to the camera body and to write the update file from the camera body into the non-volatile memory on the camera head's side.

This embodiment has been described on the example in which wired communication established by fitting the memory card to the camera body and connecting the USB cable is adopted when the camera body acquires the update data for updating the camera head data. However, the present invention is not limited only to this configuration. For example, it is also possible to apply wireless communication hereto, such as radio wave communication in compliance with the Bluetooth standard or infrared communication in compliance with the Infrared Data Association (IRDA) standard.

What is claimed is:

1. A camera system having a camera head provided with a photographic optical system and an image pickup device and configured to generate image signals in accordance with given camera head data, and a camera body which fits the camera head interchangeably, receives the image signals from the camera head, and performs signal processing in accordance with given camera body data, the camera body comprising:

an acquiring section which acquires update data for updating the camera head data; and a transmitting section which transmits the update data acquired by the acquiring section to the camera head, and the camera head comprising:

a receiving section which receives the update data transmitted from the transmitting section; and an updating section which updates the camera head data heretofore in operation with the update data received by the receiving section; and wherein the acquiring section acquires the update data irrespective of whether the update data represent the update data for updating the camera head data or the update data represent update data for updating the camera body data, the camera body further comprises a judging section which judges whether the update data acquired by the acquiring section represent the update data for updating the camera head data or the update data for updating the camera body data, and the transmitting section transmits the update data to the camera head upon a judgment which is judged by the judging section that the update data acquired by the acquiring section represent the update data for updating the camera head data.

2. The camera system according to claim 1, wherein the camera body comprises a type identifying section which identifies a type of the camera head fitted to the camera body, and the transmitting section transmits the update data to the camera head only when the update data are compatible with the type of the camera head identified by the type identifying section.

3. The camera system according to claim 1, wherein the camera body comprises a version identifying section which identifies a version of the camera head data written in the camera head fitted to the camera body, and the transmitting section transmits the update data to the camera head only when the update data acquired by the acquiring section are of a newer version than the version identified by the version identifying section.

4. The camera system according to claim 1, wherein the camera body comprises a medium accessing section which fits a portable storage medium detachably and accesses the portable storage medium fitted thereto, and the acquiring section acquires the update data by causing the medium accessing section to read the update data out of the portable storage medium fitted to the medium access section and storing the update data.

5. A camera body configured to interchangeably fit a camera head, the camera head being provided with a photographic optical system and an image pickup device and configured to generate image signals in accordance with given camera head data, the camera body being configured to receive the image signals from the camera head and to perform signal processing in accordance with given camera body data, the camera body comprising:

an acquiring section which acquires update data for updating the camera head data; and a transmitting section which transmits the update data acquired by the acquiring section to the camera head; and wherein the acquiring section acquires the update data irrespective of whether the update data represent the update data for updating the camera head data or the update data represent update data for updating the camera body data, the camera body further comprises a judging section which judges whether the update data acquired by the acquiring section represent the update data for updating the camera head data or the update data for updating the camera body data, and the transmitting section transmits the update data to the camera head upon a judgment which is judged by the judging section that the update data acquired by the acquiring section represent the update data for updating the camera head data.

6. The camera body according to claim 5, wherein the camera body comprises a medium accessing section which fits a portable storage medium detachably and accesses the portable storage medium fitted thereto, and the acquiring section acquires the update data by causing the medium accessing section to read the update data out of the portable storage medium fitted to the medium access section and storing the update data.

7. The camera system according to claim 4, wherein the camera body comprises a type identifying section which identifies a type of the camera head fitted to the camera body, and the transmitting section transmits the update data to the camera head only when the update data are compatible with the type of the camera head identified by the type identifying section.

8. The camera system according to claim 4, wherein the camera body comprises a version identifying section which identifies a version of the camera head data written in the camera head fitted to the camera body, and the transmitting section transmits the update data to the camera head only when the update data acquired by the acquiring section are of a newer version than the version identified by the version identifying section.

* * * * *